April 8, 1924.

W. R. ADDIS

MOVABLE HEADLIGHT

Filed April 4, 1923

William R. Addis
INVENTOR

BY Victor J. Evans
ATTORNEY

WITNESS: H. A. La Clair

April 8, 1924.
W. R. ADDIS
1,490,060
MOVABLE HEADLIGHT
Filed April 4, 1923
2 Sheets-Sheet 2
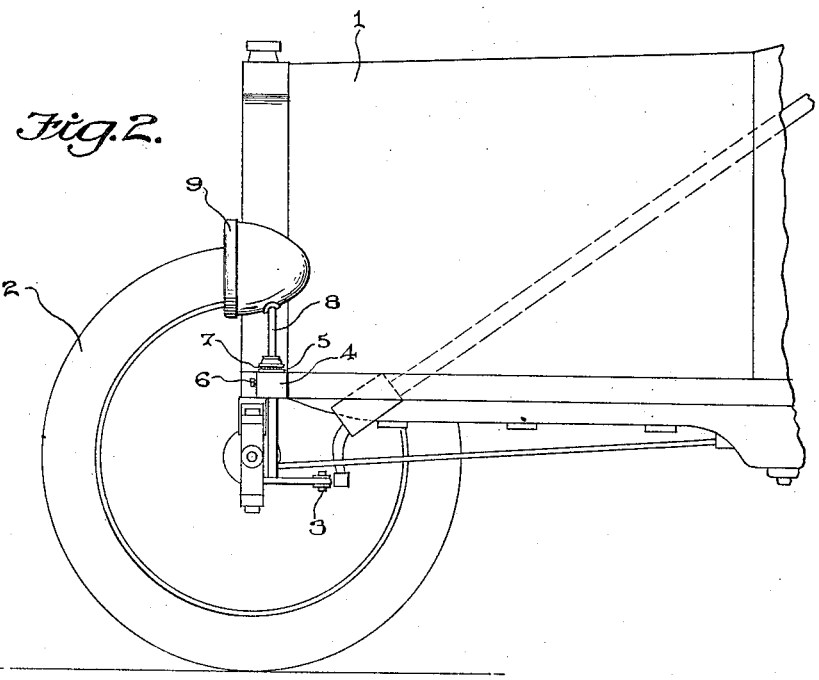
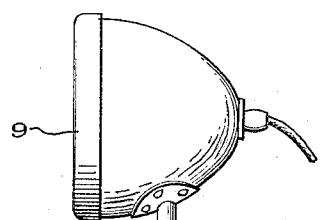
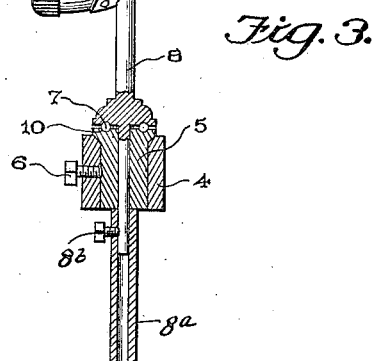
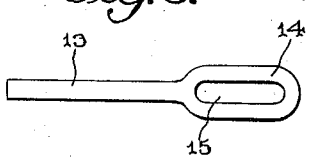
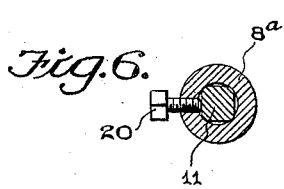
William R. Addis
INVENTOR
BY Victor J. Evans
ATTORNEY
WITNESS: H. A. LaClair Patented Apr. 8, 1924.

1,490,060

UNITED STATES PATENT OFFICE.

WILLIAM RILEY ADDIS, OF ULEDI, PENNSYLVANIA.

MOVABLE HEADLIGHT.

Application filed April 4, 1923. Serial No. 629,851.

*To all whom it may concern:*

Be it known that I, WILLIAM R. ADDIS, a citizen of the United States, residing at Uledi, in the county of Fayette and State of Pennsylvania, have invented new and useful Improvements in Movable Headlights, of which the following is a specification.

This invention relates to dirigible headlights for automobiles, and has for its primary object a simple construction capable of turning the headlights in the direction of the turning of the front wheels of an automobile, whereby the rays of light will at all times be directed ahead of the machine.

Another object of the invention is to construct a device of this character in which the ordinary headlights are employed, which is adjustable so that the same may be arranged upon different sizes of automobiles and which will not be affected by shocks and bounds to which the vehicle may be subjected.

With these and other objects in view this invention will be better understood from the following detailed description taken in connection with the accompanying drawings wherein:

Figure 2 is a side elevation thereof, one of the steering wheels being removed.

Figure 3 is a sectional view on the line 3—3 of Figure 1, on an enlarged scale.

Figure 5 is a detail view showing one of the headed members, and

Figure 6 is a detail sectional view on the line 6—6 of Figure 3.

Figure 1:
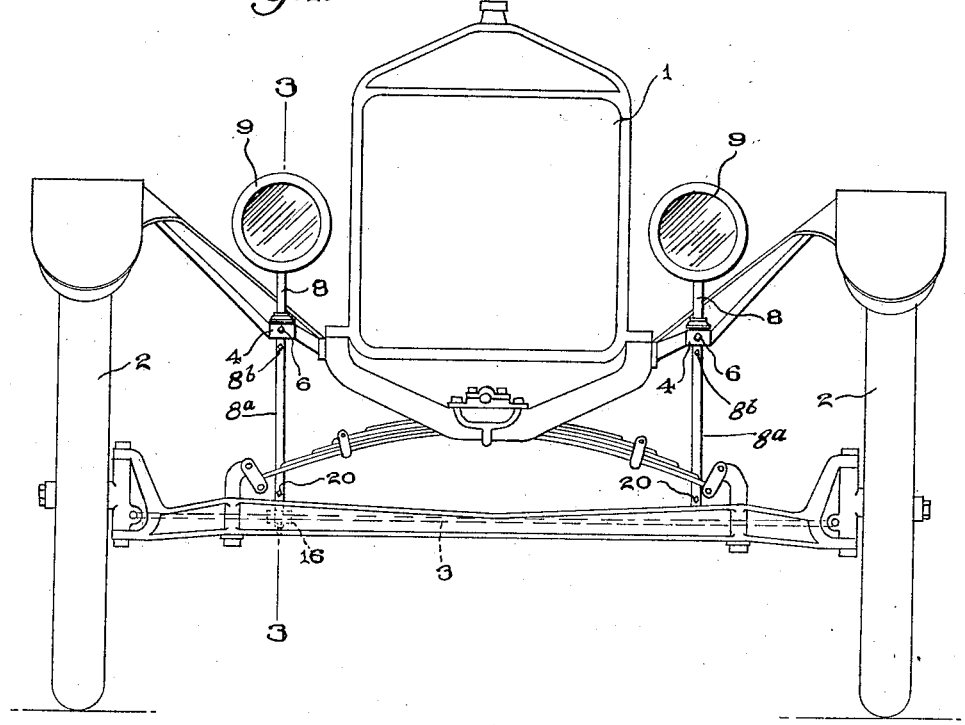
Figure 1 is a front elevation of an automobile provided with the improvement.
Figure 4:
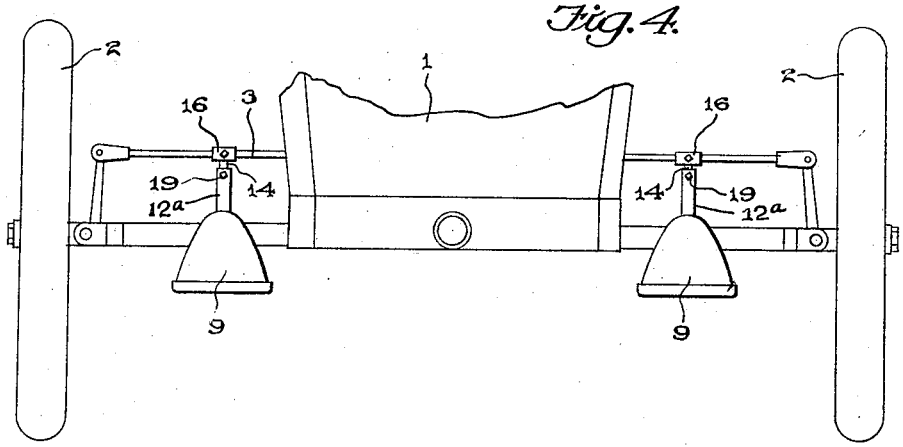
Figure 4 is a plan view of the device shown in Figure 1, parts of the automobile being omitted.

Again referring to the drawings, the numeral 1 designates an automobile, 2 the front or steering wheels therefor and 3 the connecting rod for the pivoted spindle forks for the wheels 2. The rod 3 is moved longitudinally in the usual manner upon the operation of the steering post.

In carrying out my invention I remove the ordinary lamps from the supporting brackets 4 therefor and may, if desired, employ other brackets. However, this is not essential, as I may pass through the openings in the brackets sleeves 5 and retain the said sleeves immovable by bolts 6 or analogous means. Each sleeve has its upper end widened, its outer face flat and provided with an annular groove forming a raceway for anti-frictional balls 7.

Passing centrally through the bore of the sleeve 5, and snugly in contact therewith there is a cross sectionally round member 8. Each of the cross sectionally round members 8 is in the nature of a lamp post, having secured on its upper end a head lamp casing 9 that, of course, carries the usual reflector and bulb, and the said bulb is illuminated in the usual manner. On each of the lamp posts 8 there is an enlargement 10, the said enlargement having its inner face provided with an annular groove that forms the second element of the raceway for the anti-frictional balls 7.

The lower end of each post 8 is received in the upper end of a tubular connecting member $8^a$ and held against turning movement relative thereto by a screw or the like as shown at $8^b$. The lower end of the connecting member $8^a$ is internally squared to receive the vertically disposed arm 11 of an angle member $11^a$. The second arm 12 of the said member $11^a$ may be rounded in cross section and is received in the tubular connecting member $12^a$. Designed to be received in the opposite end of the tubular connecting members $12^a$ are the stems 13 of headed members 14. The head of the member 14 is elongated and is provided with a longitudinally extending slot 15. On the rod 3 I adjustably secure collars 16. The securing means for the collars is preferably in the nature of binding bolts, and each of said collars is provided with an outstanding stud 17 designed respectively to be received in the slots 15 of the headed member 14. The studs are preferably formed with outer threaded ends on which are screwed nuts 18, and suitable cotter pins may pass through the studs for holding the outer nuts thereon.

Passing through the tubular connecting member $12^a$ and contacting with the stem 13 there is a binding element 19, and also, if desired, a similar binding element 20 may pass through each connecting member $8^a$ to contact with the arm 11 of the angle member received therein.

The angle member is not necessarily provided with the straight and hollow arms as there may be adjustably secured upon the lower horizontal arm of the said member a sleeve and in this sleeve the stem 13 may be received.

The improvement is of a simple nature which may be inexpensively attached to well-known small types of cars, and it is thought that the foregoing description when taken in connection with the drawings will fully set forth the construction, operation and advantages of the invention without further detailed description.

Having described the invention, I claim:—

The combination with an automobile having brackets for the posts of head lamps, a sleeve received in each bracket and having an outer enlargement provided with an annular groove, a lamp carrying post received through each sleeve, an enlargement on each of said posts and having its inner face provided with an annular groove to align with the groove in the sleeve to provide a raceway for anti-friction balls, each of said posts extending below said sleeves, tubular connecting members receiving the lower ends of the posts and extending downwardly therefrom, means preventing relative turning movement between said posts and connecting members, angle members having upright arms received in the lower ends of said tubular connecting members and held against turning movement relative thereto, tubular members receiving the other arms of said angle members and held against turning movement relative thereto, members having slotted heads and stems which latter are received in the tubular connecting members last named and held against turning movement relative thereto, collars secured on the steering knuckle connecting rod of the automobile, studs projecting from said collars and received respectively in the slots of the headed members, and means on said studs holding the headed members thereon.

In testimony whereof I affix my signature.

WILLIAM RILEY ADDIS.